(12) United States Patent
Ogasawara

(10) Patent No.: US 7,793,755 B2
(45) Date of Patent: Sep. 14, 2010

(54) STEERING SYSTEM FOR VEHICLE

(75) Inventor: Terumoto Ogasawara, Gamagori (JP)

(73) Assignee: Denso Corporation, Kariya (JP)

( * ) Notice: Subject to any disclaimer, the term of this patent is extended or adjusted under 35 U.S.C. 154(b) by 145 days.

(21) Appl. No.: 12/276,606

(22) Filed: Nov. 24, 2008

(65) Prior Publication Data

US 2009/0173566 A1 Jul. 9, 2009

(30) Foreign Application Priority Data

Jan. 9, 2008 (JP) .............................. 2008-002298

(51) Int. Cl.
*B62D 5/04* (2006.01)
(52) U.S. Cl. ..................... 180/446; 180/443; 180/447; 701/36; 701/41
(58) Field of Classification Search ................ 180/446, 180/443, 447, 444; 701/1, 41
See application file for complete search history.

(56) References Cited

U.S. PATENT DOCUMENTS

| | | | |
|---|---|---|---|
| 6,895,317 B2* | 5/2005 | Yasui et al. ................... 701/36 |
| 7,055,645 B2* | 6/2006 | Kato et al. ................... 180/443 |
| 7,154,404 B2 | 12/2006 | Sato | |
| 7,195,098 B2 | 3/2007 | Hidaka et al. | |
| 2005/0080532 A1* | 4/2005 | Kato et al. ................... 701/41 |
| 2005/0167181 A1 | 8/2005 | Kato et al. | |
| 2009/0026004 A1* | 1/2009 | Hidaka et al. ............... 180/446 |

FOREIGN PATENT DOCUMENTS

| | | |
|---|---|---|
| DE | 102 47 975 | 4/2004 |
| EP | 1 514 765 | 3/2005 |
| JP | 2002-340625 | 11/2002 |
| JP | 2003-306159 | 10/2003 |
| JP | 2004-291923 | 10/2004 |
| JP | 2005-43071 | 2/2005 |
| JP | 2005-132126 | 5/2005 |
| JP | 2006-177750 | 7/2006 |

OTHER PUBLICATIONS

Japanese Office Action dated Dec. 8, 2009, issued in corresponding Japanese Application No. 2008-002298, with English translation.
Chinese Office Action dated Mar. 8, 2010, issued in corresponding Chinese Application No. 200910002624.6, with English translation.
Extended European Search Report dated Mar. 19, 2009, issued in corresponding European Application No. 08019297.4—1523.
U.S. Appl. No. 12/179,638, Hidaka et al., filed Jul. 25, 2008.

* cited by examiner

*Primary Examiner*—Lesley Morris
*Assistant Examiner*—Tashiana Adams
(74) *Attorney, Agent, or Firm*—Nixon & Vanderhye PC

(57) ABSTRACT

A steering system for a vehicle is disclosed. The steering system includes variable gear ratio steering apparatus, a first ECU for controlling the apparatus, an electric power steering apparatus, a second ECU for controlling the apparatus, The steering system further includes a steering wheel angle sensor and a steering wheel angle ECU, which are integrated. The steering wheel angle sensor detects a steering wheel angle of a steering wheel. The ECU calculates an estimation value of the steering wheel angle of the steering wheel and compare between the estimation value and the detected value of the steering wheel angle. Thereby, the ECU performs a process of determining detection accuracy of the steering wheel angle sensor.

5 Claims, 3 Drawing Sheets

STEERING SYSTEM FOR VEHICLE

CROSS REFERENCE TO RELATED APPLICATION

The present application is based on Japanese Patent Application No. 2008-2298 filed on Jan. 9 2008, the disclosure of which is incorporated herein by reference.

BACKGROUND OF THE INVENTION

1. Field of the Invention

The present invention relates to a steering system for a vehicle.

2. Description of Related Art

A steering system for a vehicle is known that includes a variable gear ratio steering (VGRS) apparatus and an electric power steering (EPS) apparatus (cf., JP-A-2005-41363 corresponding to U.S. Pat. No. 7,195,098). The VGRS apparatus varies a transmission ratio (i.e., steering gear ratio) between a steering wheel angle (i.e., steering angle) of a steering wheel and a steering tire angle (i.e., steered angle) of a tire wheel (i.e., steered wheel) by using an output of a motor. The EPS apparatus assists in steering the tire wheel by using an output of another motor.

Such a steering system for a vehicle controls current conduction to a motor (i.e., a first motor) of the VGRS apparatus to manage torques output from the first motor, and varies the steering gear ratio. Further, the steering system for a vehicle controls current conduction to a motor (i.e., a second motor) of the EPS apparatus to manage torques output from the second motor, and assists in steering the tire wheel.

Such a steering system for a vehicle further includes a first electronic control unit (ECU) for mainly controlling the VGRS apparatus and a second ECU for mainly controlling the EPS apparatus. The first and second ECUs perform various control processes including processes of controlling the current conduction to the first and second motors. Recently, the first and second ECUs have been required to perform many control processes in accordance with to a high demand for vehicle traveling stability and handling stability. As a result, the first and second ECUs are subjected to much load.

In the future, such a steering system is going to perform higher-functional control processes. Accordingly, the first and second ECUs are expected to be subjected to much more load. It is therefore necessary to reduce load applied to the first and second ECUs, in order to, for example, be prepared for upcoming higher-functional control processes.

SUMMARY OF THE INVENTION

In view of the above and other points, it is an objective of the present invention to provide a steering system for a vehicle, the steering system being capable of reducing load applied to ECUs.

According to a first aspect of the present invention, a steering system for use in a vehicle having a steering wheel and a tire wheel is provided. The steering system includes a first motor that is configured to generate a first torque for use in varying a transmission ratio between a steering wheel angle of the steering wheel and a steering tire angle of the tire wheel. The steering system further includes a first speed reducer mechanism that is configured to increase the first torque of the first motor, and that is configured to output the first torque, so that the transmission ratio is variable. The steering system further includes a first rotation angle sensor that is configured to detect a first rotation angle of the first motor. The steering system further includes a second motor that is configured to generate a second torque for use in assisting in steering the tire wheel. The steering system further includes a second speed reducer mechanism that is configured to increase the second torque of the second motor, and that is configured to output the second torque, so that the steering of the tire wheel is assisted. The steering system further includes a second rotation angle sensor that is configured to detect a second rotation angle of the second motor. The steering system further includes a steering wheel angle sensor that is configured to detect a value of a steering wheel angle of the steering wheel. The steering system further includes a steering wheel angle computation processing unit that is integrated with the steering wheel angle sensor. The steering wheel angle computation processing unit includes a steering wheel angle estimation device that is configured to respectively obtain the detected first and second rotation angles of the first and second motors from the first and second rotation angle sensors. The steering wheel angle estimation device is configured to calculate an estimation value of the steering wheel angle of the steering wheel based on the detected first and second rotation angles of the first and second motors. The steering wheel angle computation processing unit further includes a steering wheel angle comparison device that is configured to compare between the estimation value of the steering wheel angle and the detected value of the steering wheel angle.

According to a second aspect of the present invention, a steering system is provided that is adapted to be operatively coupled between a tire wheel and a steering wheel, and adapted to control a steering tire angle of the tire wheel based on a steering wheel angle of the steering wheel. The steering system includes a variable gear ratio steering apparatus that is adapted to be operatively coupled between the steering wheel and the tire wheel. The variable gear ratio steering apparatus is configured to vary a transmission ratio between the steering wheel angle of the steering wheel and the steering tire angle of the tire wheel. The variable gear ratio steering apparatus includes a first motor. The first motor is configured to generate a first torque for use in varying the transmission ratio. The steering system further includes a first ECU that is coupled with the variable gear ratio steering apparatus, and that is configured to control electric conduction to the first motor to manage the first torque. The steering system further includes an electric power steering apparatus that is adapted to be operatively coupled with the variable gear ratio steering apparatus and the tire wheel, and that is configured to assist in steering the tire wheel. The electric power steering apparatus includes a second motor. The second motor is configured to generate a second torque for use in the assisting in steering the tire wheel. The steering system further includes a second ECU that is coupled with the electric power steering apparatus, and that is configured to control electric conduction to the second motor to manage the second torque. The steering system further includes a steering wheel angle sensor that is coupled with the steering wheel, and that is configured to detect a steering wheel angle of the steering wheel. The steering system further includes a steering wheel angle sensor diagnosis unit that is integrated with the steering wheel angle sensor and that is provided separately from the first and second ECUs. The steering wheel angle sensor diagnosis unit is configured to perform a process of determining detection accuracy of the steering wheel angle sensor.

According to the above steering systems, it is possible to reduce load applied to the ECUs.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE EXEMPLARY EMBODIMENTS

Exemplary Embodiments

Figure 1:
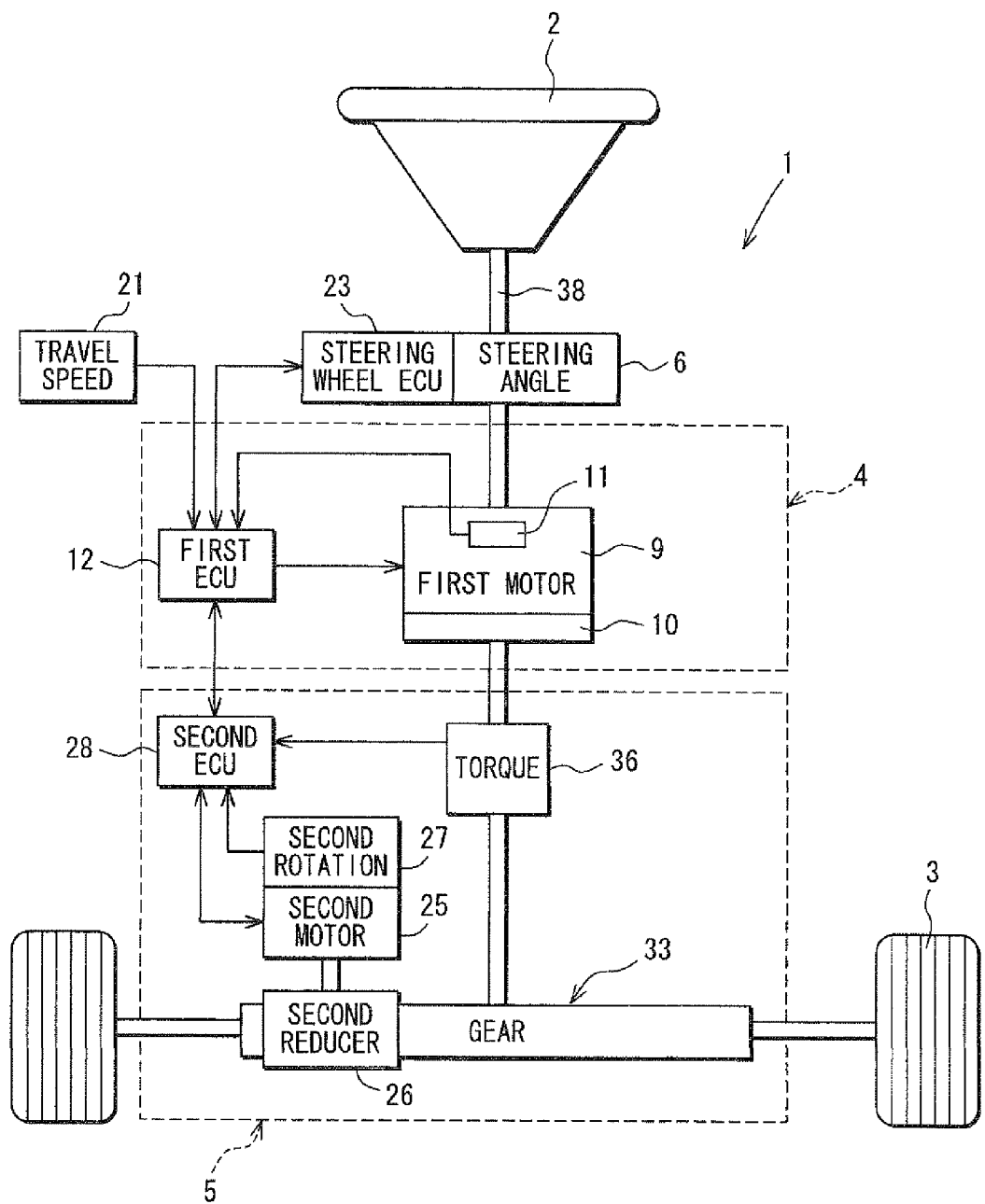
FIG. 1 is a configuration diagram illustrating a steering system for a vehicle in accordance with an exemplary embodiment.

A steering system 1 for a vehicle is described below with reference to the drawings in accordance with exemplary embodiments. As shown in FIG. 1, the steering system 1 includes a variable gear ratio steering (VGRS) apparatus 4, a electric power steering (EPS) apparatus 5, and a steering wheel angle sensor 6. The VGRS apparatus 4 can vary a transmission ratio (i.e., steering gear ratio) between an steering wheel angle (i.e., steering angle) of a steering wheel 2 and a steering tire angle (i.e., steered angle) of a tire wheel 3 (steered wheel). The EPS apparatus can assist in steering the tire wheel 3. The steering wheel angle sensor 6 detects a value of the steering wheel angle, and outputs the detected value of the steering wheel angle to the VGRS apparatus 4.

Figure 2:
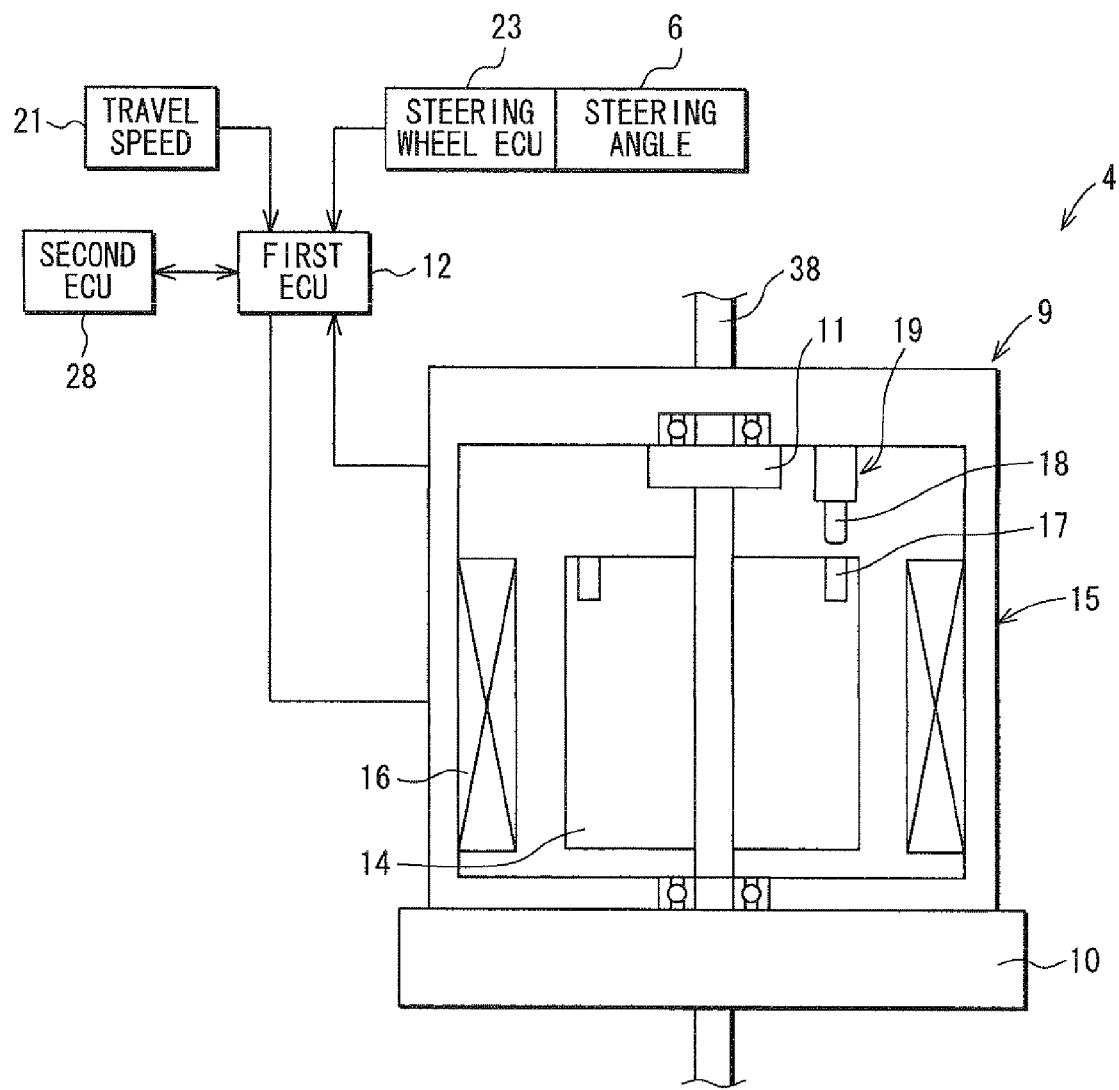
FIG. 2 is a configuration diagram illustrating a VGRS apparatus in accordance with the exemplary embodiment.

As shown in FIG. 2, the VGRS apparatus 4 includes a first motor 9, a first speed reducer mechanism 10, a first rotation angle sensor 11, and a first electronic control unit (ECU) 12. The first motor 9 generates a torque for the steering gear ratio to vary. The first speed reducer mechanism 10 decreases a rotation speed of the first motor 9 and increases the torque of the first motor 9. The first rotation angle sensor 11 detects a value of rotation angle of the first motor 9. The first ECU 12 controls current conduction to the first motor 9. In the VGRS apparatus 4, the torque of the first motor 9 is output with the torque being increased, so that the steering gear ratio can vary.

The first motor 9 is, for example, an interior permanent magnet synchronous motor, in which a magnet is embedded in a rotor 14, and in which a stator 15 located on a periphery side of the rotor 14 has multiple armature coils 16. Inverter control of current conduction to the armature coils 16 causes rotation of the rotor 14 and generation of torques. A solenoid device 19 is integrated into the stator 15. The solenoid device 19 can stop rotation of the rotor 14 in such a manner that a pin 18 is fitted into a hole 17 that is arranged in the rotor 14. The solenoid device 19 stops the rotation of the rotor 14 when, for example, it is unnecessary to perform a variable gear ratio steering control operation.

The first ECU 12 includes a central processing unit (CPU), a read-only memory (ROM), a memory device, an input device, a microcomputer, and inverter. The CUP performs control processing and arithmetic processing. The ROM stores various data and programs. The memory device includes, for example, a random access memory (RAM). The microcomputer includes an output device. The inverter performs current conduction to the armature coils 16 in accordance with a control signal output from the microcomputer.

The first ECU 12 obtains various information on the detected values from the steering wheel angle sensor 6, the first rotation angle sensor 11, a vehicle speed sensor 21 and the like. Based on the various information, the first ECU 12 controls the current conduction to the armature coils 16, and thereby performs the variable gear ratio steering control operation. In addition, the first ECU 12 controls the solenoid device 19. Through an in-vehicle LAN, the value detected by the steering wheel angle sensor 6 is input to the first ECU 12 via a steering wheel angle ECU 23. The first speed reducer mechanism 10 includes, for example, a known planetary gear mechanism. The first rotation angle sensor 11 includes, for example, a known encoder, and detects a value of a rotation angle of the rotor 14.

Figure 3:
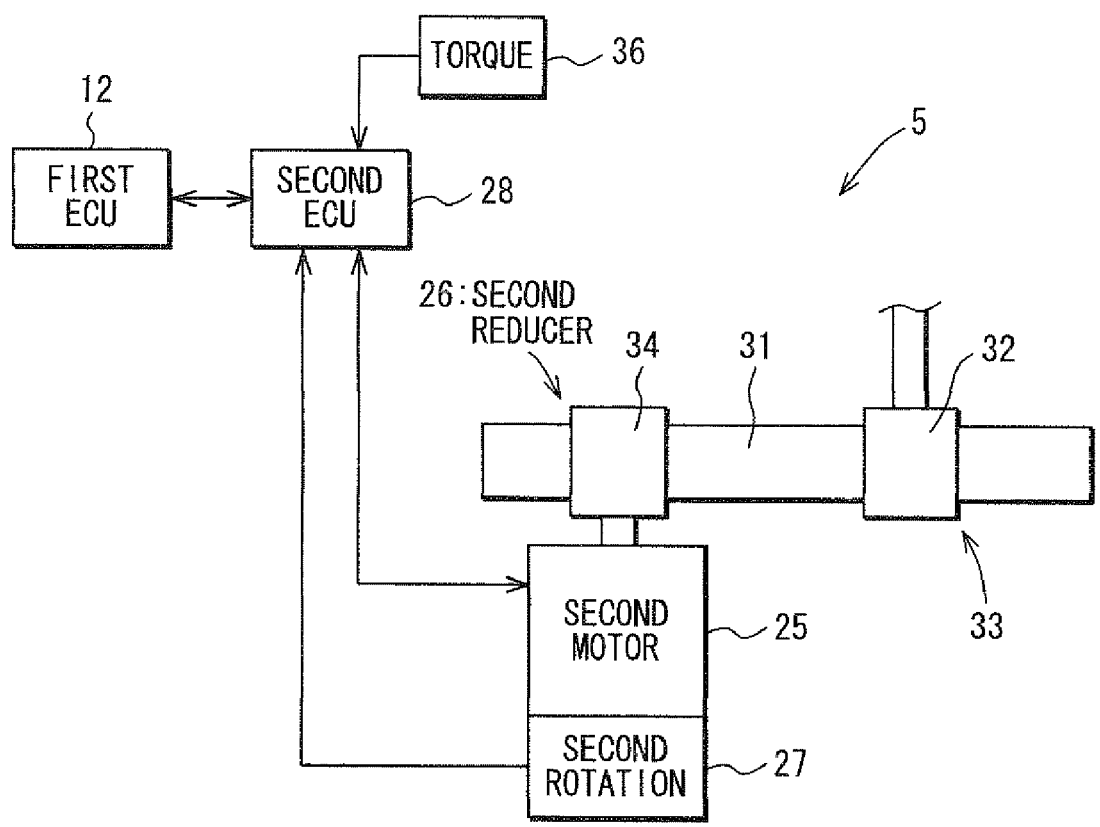
FIG. 3 is a configuration diagram illustrating an EPS apparatus in accordance with the exemplary embodiment.

As shown in FIG. 3, the EPS apparatus 5 includes a second motor 25, a second speed reducer mechanism 26, a second rotation angle sensor 27, and a second ECU 28. The second motor 25 generates a torque for assisting in steering the tire wheel 3. The second speed reducer mechanism 26 decreases a rotation speed of the second motor 25 and increases the torque of the second motor 25. The second rotation angle sensor 27 detects a value of a rotation angle of the second motor 25. The second ECU 28 controls current conduction to the second motor 25. In the EPS apparatus 5, the torque of the second motor 25 can be output with the torque being increased to assist in steering the tire wheel 3.

The second motor 25 is, for example, an interior permanent magnet synchronous motor, a configuration of which may be similar to the first motor 9. The second rotation angle sensor 27 includes, for example, an encoder, and is similar to the first rotation angle sensor 11. The second rotation angle sensor 27 detects a value of a rotation angle of a rotor (not shown) of the second motor 25.

A torque based on the operation of the steering wheel 2 is transmitted via the VGRS apparatus 4 to the tire wheel 3 by a gear mechanism 33 that includes a rack 31 and a pinion 32. The second speed reducer mechanism 26 is a rack-and-pinion speed reducer mechanism, and includes a pinion 34 that engages with the rack 31 at a position different from where the pinion 32 engages with the rack 31. The pinion 34 is connected to a rotation shaft of the second motor 25.

The second ECU 28 obtains various information on the detected values from the steering wheel angle sensor 6, the first and second rotation angle sensors 11, 27, a torque sensor 36, and the like. Based on the various information, the second ECU 28 controls current conduction to an armature coils (not shown) of the second motor 25, thereby the second ECU 28 controls assistance for the steering of the tire wheel 3.

The torque sensor 36 is provided between an output side of the VGRS apparatus 4 and an input side of the gear mechanism 33 (see FIG. 1). The torque sensor 36 detects a value of a torsion angle of a torsion bar (not shown), and thereby detects torque to be input to the gear mechanism 33. Through the in-vehicle LAN, the values detected by the steering wheel angle sensor 6 and the first rotation angle sensor 11 is input to the second ECU 28 from the first ECU 12. Through the in-vehicle LAN, the values detected by the second rotation angle sensor 27 and the torque sensor is input to the first ECU 12 from the second ECU 28.

The steering wheel angle sensor 6 includes, for example, an encoder that is similar to that in the first or second rotation angle sensors 11, 27. The steering wheel angle sensor 6 is attached to a steering shaft 38, which is integrated with the steering wheel 2. The steering wheel angle sensor 6 is integrated with a steering wheel angle computation processing unit 23 (also referred to herein as a steering wheel angle ECU 23). To output the detected value of the steering wheel angle to the first ECU 12, the steering wheel angle ECU 23 has a control processing function, as the first and second ECUs 12, 28 have.

Through the in-vehicle LAN, the values detected by the first and second rotation angle sensors 11, 27 are input to the steering wheel angle ECU 23 from the first EUU 12. The values detected by the first and second rotation angle sensors 11, 27 are, in other words, the detected values of the rotation angles of the first and second motors 9, 25. The steering wheel angle ECU 23 can function as a steering wheel angle estimation means or device 23 that estimates an estimation value of the steering wheel angle based on the detected values of the rotation angles of the respective first and second motors 9, 25. The steering wheel angle ECU 23 also can function as a steering wheel angle comparison means or device 23. The steering wheel angle comparison means or device 23 obtains the estimation value of the steering wheel angle from the steering wheel angle estimation means or device 23 and he detected value of the steering wheel angle from the steering wheel angle sensor 6. The steering wheel angle comparison means or device 23 compares between the estimation value of the steering wheel angle and the detected value of the steering wheel angle. Thus, the steering wheel angle ECU 23 performs a process of determining detection accuracy in the steering wheel angle sensor 6. The steering wheel angle estimation means or device 23 estimates the estimate value of the steering wheel angle based on the following equation:

$$\theta_E = \alpha_1 \theta_{S,1} + \alpha_2 \theta_{S,2}$$

where $\alpha_1$ is a gear ratio of the first speed reducer mechanism 10, $\theta_{S,1}$ is the detected value of the rotation angle of the first motor 9, $\alpha_2$ is a gear ratio of the second speed reducer mechanism 26, and $\theta_{S,2}$ is the detected value of the rotation angle of the second motor 25.

According to the above steering system 1 for a vehicle, the steering wheel angle ECU 23 is integrated with the steering wheel angle sensor 6. Further, the steering wheel angle ECU 23 estimates an estimate value of the steering wheel angle based on the above equation, and compares the estimation value of the steering wheel angle and the detected value obtained from the steering wheel angle sensor 6. Thereby, the steering wheel angle ECU 23 performs the process of determining the detection accuracy in the steering wheel angle sensor 6. It should be noted that, in a conventional system, the first ECU 12 and the second ECU 28 perform such a process of determining the detection accuracy in the steering wheel angle sensor 6. According to the present embodiments, however, since the steering wheel angle ECU 23 perform the process of determining the detection accuracy in the steering wheel angle sensor 6, it is possible to reduce the load applied to the first and second ECUs 12, 28.

The above embodiments can be modified in various ways. Examples of modifications are described below.

According to the steering system 1 of the above embodiments, each of the first and second rotation angle sensors 11, 27 and the steering wheel angle sensor 6 includes an encoder. Alternatively, each of or some of the first and second rotation angle sensors 11, 27 and the steering wheel angle sensor 6 may include a resolver, a hall integrated circuit (IC), or the like.

According to the steering system 1 of the above embodiments, each of the first and second motors 9, 25 is an interior permanent magnet synchronous motor. Alternatively, one of or both of the first and second motors 9, 25 may be a surface permanent magnet synchronous motor, a switched reluctance motor, a synchronous reluctance motor, or the like.

According to the steering system 1 of the above embodiments, the steering wheel angle ECU 23 obtains a detected value of the rotation angle of the first motor 9 by using the in-vehicle LAN. Alternatively, the detected value of the rotation angle of the first motor 9 may be input to the steering wheel angle ECU 23 from the first rotation angle sensor 11 by using another unit or means, for example, a wiring.

According to the steering system 1 of the above embodiments, the first ECU 12 obtains the detected value of the rotation angle of the second motor 25 through communication between the first ECU 12 and the in-vehicle LAN. Alternatively, another LAN line may be provided between the steering wheel angle ECU 23 and the second ECU 28 so that the detected value of the rotation angle of the second motor 25 is input from the second ECU 28 to the steering wheel angle ECU 23. Alternatively, the detected value of the rotation angle of the second motor 25 may be input from the second ECU 28 to the steering wheel angle ECU 23 by another unit or means.

According to the steering system 1 of the above embodiments, the VGRS apparatus 4 is configured such that the torque of the first motor 9 is increased in the first speed reducer mechanism 10 having a planetary gear mechanism and then is output. However, the first speed reducer mechanism 10 of the VGRS apparatus 4 may not be limited to that having a planetary gear mechanism. For example, the first speed reducer mechanism 10 may include harmonic gear mechanism, or another mechanism.

According to the steering system 1 of the above embodiments, the EPS apparatus 5 is configured such that the torque of the second motor 25 is increased in the second speed reducer mechanism 26 having a rack-and-pinion mechanism, and then is output. However, the second speed reducer mechanism 26 of the EPS apparatus 5 may not be limited to that having a rack-and-pinion mechanism. For example, the second motor 25 may be a rack coaxial motor, and the second speed reducer mechanism 26 may have a ball screw. Alternatively, the second speed reducer mechanism 26 may have another mechanism.

According to a first aspect of the exemplary embodiments, the following steering system 1 for a vehicle having a steering wheel 2 and a tire wheel 3 can be provided. The steering system includes a first motor 9 that is configured to generate a first torque for use in varying a transmission ratio between a steering wheel angle of the steering wheel 2 and a steering tire angle of the tire wheel 3. The steering system 1 further includes a first speed reducer mechanism 10 that is configured to increase the first torque of the first motor 9, and that is configured to output the first torque, so that, so that the transmission ratio is variable. The steering system 1 further includes a first rotation angle sensor 11 that is configured to detect a first rotation angle of the first motor 9. The steering system 1 further includes a second motor 25 that is configured to generate a second torque for assisting in steering the tire wheel 3. The steering system 1 further includes a second speed reducer mechanism 26 that is configured to increase the second torque of the second motor 25, and that is configured to output the second torque, so that the steering of the tire wheel 3 is assisted. The steering system 1 further includes a second rotation angle sensor 27 that is configured to detect a second rotation angle of the second motor 25. The steering system 1 further includes a steering wheel angle sensor 6 that is configured to detect a value of a steering wheel angle of the steering wheel 2. The steering system 1 further includes a steering wheel angle computation processing unit 23 that is integrated with the steering wheel angle sensor 6. The steering wheel angle computation processing unit 23 includes a steering wheel angle estimation device 23 that is configured to respectively obtain the detected first and second rotation angles of the first and second motors 9, 25 from the first and second rotation angle sensors 11, 27. The steering wheel angle estimation device 23 is configured to calculate an estimation value of the steering wheel angle of the steering wheel 2 based on the detected first and second rotation angles of the first and second motors 9, 25. The steering wheel angle computation processing unit 23 further includes a steering wheel angle comparison device 23 that is configured to compare between the estimation value of the steering wheel angle and the detected value of the steering wheel angle.

Alternatively, the above steering system 1 may be configured as follows. The steering wheel angle estimation device 23 is configured to calculate the estimation value $\theta_E$ of the steering wheel angle based on the following equation:

$$\theta_E = \alpha_1 \theta_{S,1} + \alpha_2 \theta_{S,2}$$

where $\alpha_1$ is a gear ratio of the first speed reducer mechanism 10, $\theta_{S,1}$ is the detected first rotation angle of the first motor 9, $\alpha_2$ is a gear ratio of the second speed reducer mechanism 26, and $\theta_{S,2}$ is the detected second rotation angle of the second motor 25.

Alternatively, the above steering system 1 may be configured as follows. The steering wheel angle estimation device 23 is configured to obtain the gear ratio of the first speed reducer mechanism 10 from the first speed reducer mechanism 10. The steering wheel angle estimation device 23 is configured to obtain the gear ratio of the second speed reducer mechanism 26 from the second speed reducer mechanism 26.

Alternatively, the above steering system 1 may further includes a first ECU 12 and a second ECU 28. The first ECU 12 may be configured to control current conduction to the first motor 9 to manage the first torque. The second ECU 28 may be configured to control current conduction to the second motor 25 to manage the second torque. The first ECU 12, the second ECU 28 and the steering wheel angle computation processing unit 23 may be provided separately from one another.

According to a second aspect of the exemplary embodiments, a steering system is provided that is adapted to be operatively coupled between a tire wheel 3 and a steering wheel 2, and adapted to control a steering tire angle of the tire wheel 3 based on a steering wheel angle of the steering wheel 2. The steering system includes a variable gear ratio steering apparatus 4 that is adapted to be operatively coupled between the steering wheel 2 and the tire wheel 3. The variable gear ratio steering apparatus 4 is configured to vary a transmission ratio between the steering wheel angle of the steering wheel 2 and the steering tire angle of the tire wheel 3. The variable gear ratio steering apparatus 4 includes a first motor. The first motor 9 is configured to generate a first torque for use in varying the transmission ratio. The steering system further includes a first ECU 12 that is coupled with the variable gear ratio steering apparatus 4, and that is configured to control electric conduction to the first motor 9 to manage the first torque. The steering system further includes an electric power steering apparatus 5 that is adapted to be operatively coupled with the variable gear ratio steering apparatus 4 and the tire wheel 3, and that is configured to assist in steering the tire wheel 3. The electric power steering apparatus 5 includes a second motor 25. The second motor 25 is configured to generate a second torque for use in the assisting in steering the tire wheel 3. The steering system further includes a second ECU 28 that is coupled with the electric power steering apparatus 5, and that is configured to control electric conduction to the second motor 25 to manage the second torque. The steering system further includes a steering wheel angle sensor 6 that is coupled with the steering wheel 2, and that is configured to detect a steering wheel angle of the steering wheel 2. The steering system further includes a steering wheel angle sensor diagnosis unit 23 that is integrated with the steering wheel angle sensor 6, and that is provided separately from the first and second ECUs 12, 28. The steering wheel angle sensor diagnosis unit 23 is configured to perform a process of determining detection accuracy of the steering wheel angle sensor 6.

The steering wheel angle is a parameter that is required in controlling the current conduction to the first and second motors 9, 25. Further, the steering angle sensor is required to have high precision detection accuracy. In a conventional manner, a first ECU 12 and a second ECU 28 receive inputs associated with the detected value of a steering wheel angle from a steering wheel angle sensor 6, and perform a process of determining detection accuracy of the steering wheel angle sensor 6. In the above exemplary embodiments, the steering wheel angle sensor 6 is integrated with the steering wheel angle computation processing unit 23. For the steering wheel angle computation processing unit 23 to output the detected value of the steering wheel angle to the first and second ECUs 12, 28, the steering wheel angle computation processing unit 23 has a control computation function similar to, for example, those of the first and second ECUs 12, 28.

In the above exemplary embodiments, the steering wheel angle sensor 6 and the steering wheel angle computation processing unit 23 are integrated. Further, the steering wheel angle computation processing unit 23 performs the process of determining detection accuracy of the steering wheel angle sensor 6, that is, the steering wheel angle computation processing unit 23 includes the steering wheel angle estimation device 23 and the steering wheel angle comparison device 23. Accordingly, the process of determining detection accuracy of the steering wheel angle sensor 6 can be removed from processes to be performed by first and second ECUs 12, 28. It is therefore possible to reduce load applied to the first and second ECUs 12, 28.

While the invention has been described above with reference to various embodiments thereof, it is to be understood that the invention is not limited to the above described embodiments and construction. The invention is intended to cover various modifications and equivalent arrangements. In addition, while the various combinations and configurations described above are contemplated as embodying the invention, other combinations and configurations, including more, less or only a single element, are also contemplated as being within the scope of embodiment.

What is claimed is:

1. A steering system for use in a vehicle having a steering wheel and a tire wheel, the steering system comprising:

a first motor that is configured to generate a first torque for use in varying a transmission ratio between a steering wheel angle of the steering wheel and a steering tire angle of the tire wheel;

a first speed reducer mechanism that is configured to increase the first torque of the first motor and output the first torque so that the transmission ratio is variable;

a first rotation angle sensor that is configured to detect a first rotation angle of the first motor;

a second motor that is configured to generate a second torque for use in assisting in steering the tire wheel;

a second speed reducer mechanism that is configured to increase the second torque of the second motor and output the second torque so that the steering of the tire wheel is assisted;

a second rotation angle sensor that is configured to detect a second rotation angle of the second motor;

a steering wheel angle sensor that is configured to detect a value of a steering wheel angle of the steering wheel; and a steering wheel angle computation processing unit that is integrated with the steering wheel angle sensor, wherein the steering wheel angle computation processing unit includes:

a steering wheel angle estimation device that is configured to respectively obtain the detected first and second rotation angles of the first and second motors from the first and second rotation angle sensors, wherein the steering wheel angle estimation device is configured to calculate an estimation value of the steering wheel angle of the steering wheel based on the detected first and second rotation angles; and a steering wheel angle comparison device that is configured to compare between the estimation value of the steering wheel angle and the detected value of the steering wheel angle.

2. The steering system according to claim 1, wherein:
the steering wheel angle estimation device is configured to calculate the estimation value $\theta_E$ of the steering wheel angle based on the following equation:

$$\theta_E = \alpha_1 \theta_{S,1} + \alpha_2 \theta_{S,2}$$

where $\alpha_1$ is a gear ratio of the first speed reducer mechanism,
$\theta_{S,1}$ is the detected first rotation angle of the first motor,
$\alpha_2$ is a gear ratio of the second speed reducer mechanism, and
$\theta_{S,2}$ is the detected second rotation angle of the second motor.

3. The steering system according to claim 2, wherein:
the steering wheel angle estimation device is configured to obtain the gear ratio of the first speed reducer mechanism from the first speed reducer mechanism; and
the steering wheel angle estimation device is configured to obtain the gear ratio of the second speed reducer mechanism from the second speed reducer mechanism.

4. The steering system according to claim 1, further comprising:
a first ECU that is configured to control current conduction to the first motor to manage the first torque; and
a second ECU that is configured to control current conduction to the second motor to manage the second torque,
wherein the first ECU, the second ECU and steering wheel angle computation processing unit are provided separately from one another.

5. A steering system adapted to be operatively coupled between a tire wheel and a steering wheel, and adapted to control a steering tire angle of the tire wheel based on a steering wheel angle of the steering wheel, the steering system comprising:

a variable gear ratio steering apparatus that is adapted to be operatively coupled between the steering wheel and the tire wheel, wherein the variable gear ratio steering apparatus is configured to vary a transmission ratio between the steering wheel angle of the steering wheel and the steering tire angle of the tire wheel, wherein the variable gear ratio steering apparatus includes a first motor, wherein the first motor is configured to generate a first torque for use in varying the transmission ratio;

a first ECU that is coupled with the variable gear ratio steering apparatus, and that is configured to control electric conduction to the first motor to manage the first torque;

an electric power steering apparatus that is adapted to be operatively coupled with the variable gear ratio steering apparatus and the tire wheel, and that is configured to assist in steering the tire wheel, wherein the electric power steering apparatus includes a second motor, wherein the second motor is configured to generate a second torque for use in the assisting in steering the tire wheel;

a second ECU that is coupled with the electric power steering apparatus, and that is configured to control electric conduction to the second motor to manage the second torque;

a steering wheel angle sensor that is coupled with the steering wheel, and that is configured to detect a steering wheel angle of the steering wheel; and a steering wheel angle sensor diagnosis unit that is integrated with the steering wheel angle sensor, and that is provided separately from the first and second ECUs, wherein the steering wheel angle sensor diagnosis unit is configured to perform a process of determining detection accuracy of the steering wheel angle sensor.

* * * * *